United States Patent [19]

Frei

[11] 4,151,978

[45] May 1, 1979

[54] STROKE LIMITING APPARATUS FOR HYDRAULIC CYLINDERS

[75] Inventor: Roger E. Frei, Calgary, Canada

[73] Assignees: George Senegal, Regina; Elmer Ormiston, Saskatchewan, both of Canada

[21] Appl. No.: 784,726

[22] Filed: Apr. 5, 1977

[30] Foreign Application Priority Data

Jul. 29, 1976 [CA] Canada .................................. 258101

[51] Int. Cl.[2] ...................... F16K 15/00; F16K 51/00; F15B 15/22

[52] U.S. Cl. .................................... 251/319; 251/145; 91/404

[58] Field of Search .................. 91/404, 405; 251/145, 251/143, 146; 251/319

[56] References Cited

U.S. PATENT DOCUMENTS

| | | | |
|---|---|---|---|
| 2,606,414 | 8/1952 | Dyrr | 91/404 |
| 2,699,150 | 1/1955 | Liskal | 91/405 |
| 3,667,347 | 6/1972 | Patrick | 91/404 |
| 3,972,265 | 8/1972 | Magnuson | 91/404 |

FOREIGN PATENT DOCUMENTS

| | | | |
|---|---|---|---|
| 645396 | 9/1948 | United Kingdom | 251/319 |

*Primary Examiner*—Paul E. Maslousky

*Attorney, Agent, or Firm*—Shlesinger, Arkwright, Garvey & Dinsmore

[57] ABSTRACT

The invention relates to a valve assembly adapted in conjunction with a valve actuator to provide positive control of the stroke of hydraulic cylinders. The valve is attached to a pressure port on the cylinder and the actuator assembly is positioned on the side of the cylinder and held by means of clamps. The stroke of the cylinder is limited when the actuator arm is clamped on the piston shaft at a distance shorter than the full stroke of the cylinder. In this condition as the shaft moves into the cylinder, the actuator arm contacts closure means within the valve thereby closing off the valve and preventing further retraction of the cylinder. The apparatus of the invention is adapted to be supplied in the kit form and can be readily attached, externally to any existing hydraulic actuator.

1 Claim, 3 Drawing Figures

STROKE LIMITING APPARATUS FOR HYDRAULIC CYLINDERS

BACKGROUND OF THE INVENTION

The invention relates to apparatus for controlling the extent of movement of hydraulic components and more particularly to apparatus adapted for external attachment to hydraulic cylinders to control the stroke thereof.

It is known to provide fluid-pressure cylinder and piston units, on for example tractor-associated agricultural equipment, with stops co-operative between the cylinder and piston to positionally determine the extent of relative movement therebetween.

One such example is to be found in U.S. Pat. Ser. No. 2,442,306 (McCormick). In this system we have the situation where the fluid-pressure cylinder is exhausted, for example, to allow the piston rod to retract when the agricultural tool is lowered. To ensure lowering to the same extent, a stop is provided which is adjustable to achieve variation in the extent of distance travelled. McCormick discloses a construction in which a stop is adjustable by means of the selective position of one or more pins on a rod carried yoke.

In another example, namely U.S. Pat. No. 2,615,430 (Fletcher), an adjustable stop is utilized to operate a control valve which cuts off the discharge of exhausting fluid to achieve the same general end result, that is, when the fluid exhaust is cut off, the piston will stop at a predetermined point.

In both of the aforementioned prior arrangements, it was necessary to provide complex fluid power units and control systems to achieve the stroke limiting feature.

SUMMARY OF THE INVENTION

The present invention however, seeks to provide a novel and much simplified stroke-limiting valve that may be readily attached to existing, conventional hydraulic components without requiring design modifications.

Accordingly, the invention comprises a stroke-limiting valve assembly adapted to provide positive control of the stroke of hydraulic cylinders. The valve is attached externally to one of the pressure ports of the cylinder and comprises a housing having a fluid inlet port; fluid exhaust port; fluid receiving chamber; and a plurality of fluid passages, separately interconnecting said chamber with the inlet and outlet ports. At the point of intersection with one of the fluid passages, the chamber is formed as a valve seat, and a valve, positioned with the chamber, is slidably mounted such that the valve defines a poppet valve with the valve seat. The stem of the valve projects externally of the housing and is contacted by any suitable actuator, which may be attached to the external surface of the cylinder, and for example motivated by the movement of the piston shaft. In such a case, a stop or actuator arm is clamped on the piston shaft at a distance shorter than the full stroke of the cylinder. Thus the stroke of the cylinder is limited when the actuator contacts the projecting valve stem and closes the valve.

BRIEF DESCRIPTION OF THE DRAWINGS

The invention will now be described by way of example only, reference being had to the accompanying drawings in which.

DESCRIPTION OF THE PREFERRED EMBODIMENTS

Figure 1:
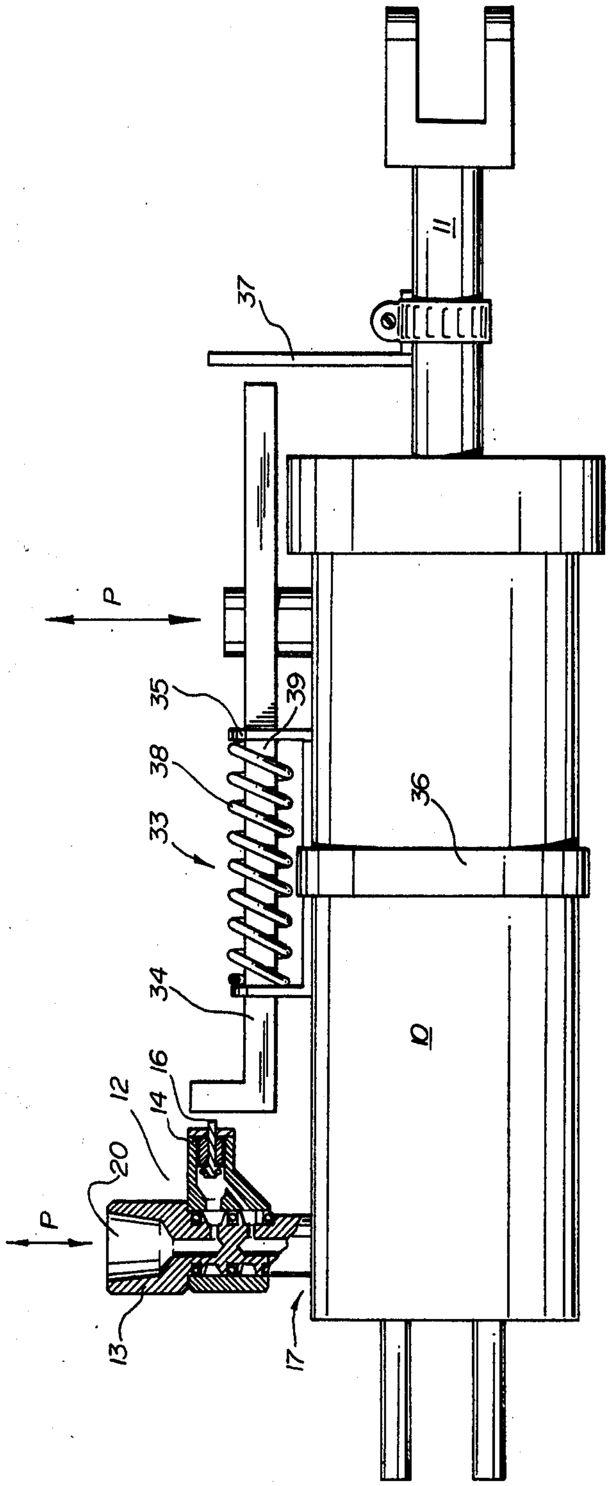
FIG. 1 is a side view of a conventional hydraulic cylinder on which is operably attached the valve of the invention and a suitable valve actuating device, for the purpose of limiting retracted stroke.

As can be seen from the drawings, the novelty of the present invention lies not only in the simplicity of its structure and operation, but also in the fact that the valve and actuator can be supplied as a "kit of parts" and applied directly to existing hydraulic cylinders.

Referring now to the drawings, the power unit, which does not form part of the present invention comprises a conventional cylinder member and piston member indicated generally by numerals 10, 11 respectively.

Figure 2:
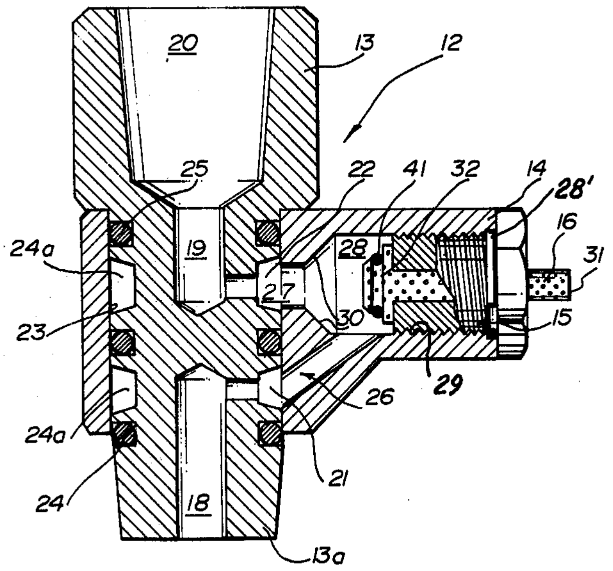
FIG. 2 is an enlarged view of the valve assembly according to the invention.

The first major component of the inventive system is a valve assembly 12, which in the preferred embodiments, is shown as a two part structure. However it is appreciated that the valve could readily be provided as a one piece casting or indeed machined as a single component if required. In the present example as shown in FIG. 1 and 2, the inventive assembly consists in a valve housing comprising valve port member 13, valve body member 14, and a valve sleeve member 15 which supports sliding valve 16. The components are shown assembled in FIG. 1 and in more detail in FIG. 2. Member 13 has two separate, internal and centrally disposed fluid passages formed therein, one, given reference numeral 18 provides communication with the exhaust port 17 of the cylinder 10, and the other, given reference numeral 19, communicates with a fluid pressure line (not shown) which is adapted to be conveniently attached to member 13 at 20. Each of passages 18 and 19 exit substantially horizontally through the same side of member 13 at adjacent locations or ports 21 and 22, respectively, intermediate the length of member 13. Grooves 24 are provided at vertically spaced locations about the circumference of member 13 and house conventional O-ring type high pressure seals 25.

Valve body member 14 provides the second major component of assembly 12, and is formed such that it sealingly receives within vertical bore 23 (FIG. 2), that cylindrical portion of member 13 through which passage 18 and 19 exit via ports 21 and 22 respectively.

As can be seen from FIG. 2, valve body member 14 is provided with internal fluid passages 26 and 27, which, when member 14 is operably aligned with member 13, are in fluid communication with passages 20 and 21 of the latter mentioned member. It will be additionally noted that the circumference of member 13 provided with grooves **24*a* and that the ports 21 and 22 exit, within an associated groove 24*a*. The purpose of these grooves is to ensure that there will always be fluid connection between members 13 and 14 irrespective of any deviation in the positioning of member 14. Each of passages 26 and 27 intersect an enlarged, horizontal passage or chamber 28 provided in member 14, within which chamber, valve sleeve member 15 is sealingly contained. In view of the high operating pressures of the system, valve sleeve member 15 is in the form of a threaded plug screwed into the outer portion 29 of chamber 28 and held against internal pressure by retaining ring 28'. The innermost end of chamber 28, adjacent outlet passage 27, is formed to have tapered valve seating faces 30 and to complete the assembly, a valve 16 is mounted axially within a central bore of sleeve 15 such that it is slidable from its normal rearwardly stopped position, as shown in FIG. 2 to a position where head 32 of valve 16 abuts with valve seat 30, this defining a poppet valve with valve seat 30**. Conventional high pressure O-ring seals (not shown) may be utilized to prevent leakage of hydraulic fluid.

As also will appreciated from the drawings, valve 16 is provided with an elongated stem 31, the end of which extends outwardly of member 14 for the purpose to be described hereafter.

Referring again to FIG. 1, the remaining components of the system can clearly be seen to comprise a push rod assembly generally indicated at 33, which is fixedly held to the external surface of cylinder 10 by means of a clamping device 36; and a push rod actuator 37 which is clamped to the piston shaft 11 at a predetermined location. Push rod assembly 33 includes, in the embodiment according to FIG. 1, a push rod 34, slidably mounted through and between the upright end portions of a U-bracket 35. Longitudinal movement of push rod 34 in the direction of valve assembly 12 is constrained by means of spring 38 which is wound about push rod 34 between the uprights of bracket 35, one end of the spring being fixedly attached to push rod 34 at 39, while the other end bears against an adjacent upright portion of bracket 35. Spring 38 further prevents longitudinal sliding movement of push rod 34 other than when contacted by actuator 37. In cases where the cylinder length is excessive, it may be necessary to support member 34 by a plurality of brackets to avoid alignment problems.

Under normal operating conditions, the hydraulic unit performs in a normal manner, the piston being able to move in either direction without interference, since valve assembly 12 allows the fluid to flow unobstructed therethrough in either direction via passages 18 and 26, chamber 28, and passages 27, and 19.

The stroke of the cylinder is only limited when the actuator arm 37 is clamped on shaft 11 at a point shorter than the full stroke of the cylinder. In this condition, as shaft 11 moves into the cylinder, actuator arm 37 contacts push rod 34 which in turn depresses valve member 16 to firstly restrict the passage of exhausting fluid through valve assembly 12. As will be appreciated from FIG. 2, passage 26 enters chamber 28 through the side of the chamber and therefore when the head of valve 16 moves into the area immediately adjacent passage 26, high pressure fluid exhausting through passage 26 will be applied behind head 32 and assist in the closure of the valve. This therefore prevents the cylinder from retracting any further and once the valve 16 is in the closed position, internal pressure within valve 12 holds the valve head 32 against valve seat 30 thus maintaining the seal. To ensure adequate sealing, a high pressure O-ring seal 41 is utilized about head 32.

As soon as a cylinder begins to extend, the pressure differential caused by the reversing of fluid through valve assembly 12 causes the movement of valve member 16 to its inoperative position as shown in FIGS. 1 and 2 and it will remain in this position until contacted once again by actuator 33.

Figure 3:
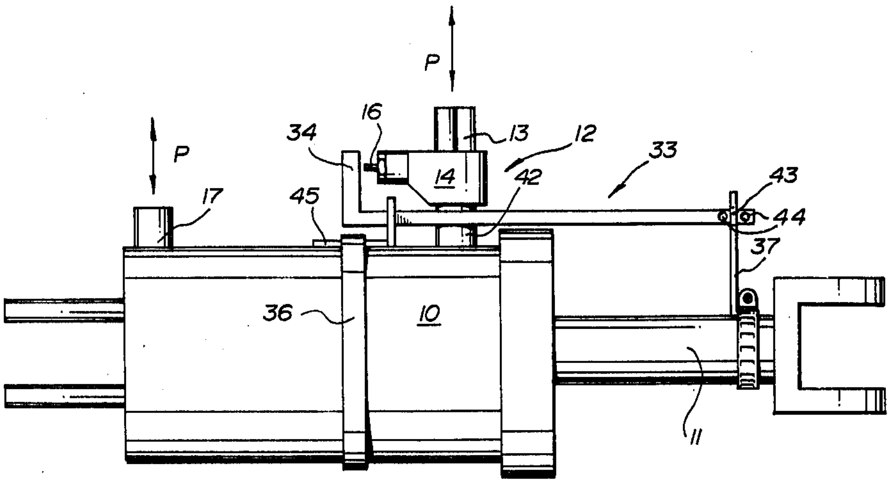
FIG. 3 shows schematically, the valve of the invention and an alternative form of valve actuating apparatus, applied to a hydraulic cylinder for the purpose of limiting extended stroke.

Looking now to FIG. 3, the assembly according to the invention is shown here attached again to a conventional hydraulic cylinder 10 and an alternative form of actuation assembly is utilized for the purpose of limiting extended stroke.

Valve assembly 12 is in this embodiment screwed into the upper pressure port 42 of cylinder 10 and as before, the push rod assembly 33, which may now be called a pull-rod assembly, is attached to the side of the cylinder by bracket 45 and the actuator arm 37 is clamped to the shaft 11 adjacent its end. The pull-rod 34 is in this embodiment inserted through a hole 43 in the actuator arm 37 and is held in this position by pin means 44.

During normal operation, the hydraulic cylinder can be used in any position and can be retracted to its full stroke.

As the shaft 11 is extended, the pull-rod 34 is drawn towards valve member 16 and subsequently continued movement of the pull-rod brings member 34 into contact with member 16 causing restriction of the flow of fluid through valve assembly 12. As previously described in connection with the embodiment according to FIG. 1, the valve eventually snaps shut, with the result that further extension of the cylinder is prevented.

As before, once the valve is closed, internal pressure holds the valve head 16 against its seat to maintain the seal.

Thereafter, during operational retraction of the cylinder, pressure is applied to the upper port and the pressure differential within valve assembly 12 causes the valve to open leaving the cylinder free to operate in a normal fashion.

Further modifications and alternative embodiments of the invention will be apparent to those skilled in the art in view of the description. Accordingly, the description is to be construed as illustrative only and is for the purpose of teaching those skilled in the art, the manner of carrying out the invention. It is understood that the form of the invention herewith shown and described is to be taken as the presently preferred embodiments. Various changes may be made in the shape size and general arrangement of components. For example, equivalent elements or materials may be substituted for those illustrated and described herein, parts may be reversed, and certain features of the invention may be used independently of the use of other features, all as will be apparent to one skilled in the art after having the benefit of the description of the invention.

What is claimed is:

1. A stroke-limiting valve assembly adapted for external attachment to a fluid pressure port on a hydraulic piston and cylinder unit, said assembly comprising:

a valve housing;

a fluid receiving chamber;

valve means positioned within said chamber and adapted for movement between a normally open position and a passage restricting position;

said valve housing comprising a first component having a generally cylindrical, longitudinally extending body portion adapted at one end for connection to said pressure port, and at the other end for connection to means exhausting pressurized fluid, said body portion having two separate fluid passages formed therein, one being a fluid inlet passage providing fluid communication between said pressure port and a first outlet port on the circumference of said body portion, and the other being a fluid exhaust package providing fluid communication between said means exhausting pressurized fluid and a second outlet port on the circumference of said body portion, each said outlet port being spaced apart one from the other in the longitudinal direction of said body portion, and operably associated with separate unconnected circumferential groove means formed in the outer surface of said body portion;

a second component having a first passage means extending therethrough adapted to releasably receive in fluid tight relation that portion of said first component having formed therein said grooves and said outlet ports, and a second passage means defining said fluid receiving chamber, extending substantially normal to said first passage, said second component further provided with third and fourth passage means connecting said chamber with said first passage means at separate spaced locations;

whereby when said first component is operably assembled with said second component, said third and fourth passage means are in fluid communication with said groove means in said first component thus providing a fluid flow path between said fluid passage and said fluid exhaust passage.

* * * * *